Patented Mar. 24, 1931

1,797,655

UNITED STATES PATENT OFFICE

TURE ROBERT HAGLUND, OF STOCKHOLM, SWEDEN

PROCESS FOR THE PRODUCTION OF ALUMINUM OXIDE OR PRODUCTS CONTAINING ALUMINUM OXIDE OUT OF MATERIAL CONTAINING ALUMINUM SULPHIDE

No Drawing. Application filed November 6, 1926, Serial No. 146,854, and in Sweden November 18, 1925.

This invention relates to the production of aluminum oxide or products containing aluminum oxide out of material containing aluminum sulphide or such material that beside crystallized aluminum oxide (corundum) also contains one or more sulphides of aluminum, calcium, barium or magnesium. According to the invention the sulphidiferous material is subjected to oxidation, preferably under such conditions that sulphur liberated at the oxidation of sulphide wholly or substantially is obtained as free sulphur. According to certain modifications of the invention, however, the oxidation may also be carried out in such a way that the sulphide sulphur is combined with carbon or oxygen. This invention also embraces processes for refining products of decomposition formed at the oxidation of sulphidiferous material of above named kind, and specially such processes that relate to the separation of aluminum oxide or aluminum oxy-hydrate, formed by decomposition of aluminum sulphide, from contaminating sulphides of iron, titanium and others.

To obtain free sulphur when oxidizing material containing aluminum sulphide according to this invention, one must either use oxidizing agent, for instance air, in so inadequate quantities that the oxygen is not sufficient to oxidize also the sulphide sulphur, or one may as oxidizing agents use substances, such as sulphurous acid gas, that cannot act with oxidizing effect upon sulphur. The decomposition may in the latter case follow for instance following formula:

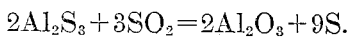
$$2Al_2S_3 + 3SO_2 = 2Al_2O_3 + 9S.$$

Thus it is seen that in this case the sulphur both in $Al_2S_3$ and in $SO_2$ is separated out as free sulphur.

The oxidation of the aluminum sulphide can be carried out at such a low temperature that the sulphur is not gasified. As a rule however, among others in order to hasten the speed of reaction, it is preferable that the oxidation takes place at such temperatures that the separated sulphur is removed in gas form from the furnace or apparatus, whereupon it may be obtained by cooling the leaving gases. When treating materials with a high percentage of aluminum sulphide, the heat of reaction developed during the reaction between aluminum sulphide and sulphurous acid is usually enough for creating such a temperature that the liberated sulphur is gasified. If the said percentage is low, such as 10-15%, the said heat of reaction will generally not be enough to effect the gasification of the sulphur. By using air or other gas containing oxygen instead of or together with sulphurous acid gas, the heat of reaction can be substantially increased. The oxidation may then be so carried out that a part of the sulphide sulphur first is oxidized by oxygen to sulphurous acid, whereupon the latter is made to react with another quantity of sulphide. A further increase in the heat of reaction is obtained when using air or other oxidiferous gas, if such gases are used in such quantities that the sulphur wholly or partly is combined as sulphurous acid and conducted away in gas form. By regulation of the admittance of oxygen and thus the oxidation of sulphur, that is the proportion between free sulphur and leaving sulphurous acid gas, one has a possibility to regulate the heat development in a simple way between rather wide limits, and thus also to regulate the temperature of reaction to be the most suitable in each special case. The treatment may alternatively be carried out with such excess of oxygen or at such temperature respectively that the oxidation is driven so far that formation of aluminum sulphate occurs. In such a case the heat development will be still more increased.

For carrying out the process, necessary heat may of course also be delivered by direct outer or inner heating. Specially suitable is the method of preheating the gases of reaction. Alternatively the sulphidiferous material may be preheated before meeting the gases of reaction. The heating may also occur by combustion of one or more of such substances as sulphur, sulphuretted hydrogen, carbon, carbon monoxide, generator gas, hydrogen, etc., with air or other gas containing oxygen in the furnace or apparatus in which the oxidation is carried out. Gases formed at such a combustion, for instance sulphurous acid, may afterwards be used in the oxidation process. When using carbon for the heating pulverized carbon may be burnt in air. One may also mix the sulphidiferous material with carbon, for instance charcoal in lump form. Also the oxidation of aluminum sulphide may alternatively be carried out by help of carbon-oxygen combinations, such as CO, $CO_2$, COS. When oxidizing with carbon-oxygen combinations one may by adjusting the quantity of reaction gas or the temperature of reaction respectively receive the sulphide sulphur at least partly combined as sulphur-carbon combinations, such as $CS_2$, COS. The best yield of $CS_2$ is obtained at a reaction temperature between 800–900° C.

Simultaneously with oxidizing gases of above named kind also a larger or smaller quantity of water steam may be used. The purpose hereof is to hasten the reaction. Through the action of the steam at least a part of the aluminum sulphide is decomposed under liberation of sulphuretted hydrogen, for instance following the formula:

$$Al_2S_3 + 3H_2O = Al_2O_3 + 3H_2S.$$

If the oxidizing gas contains sulphurous acid, the sulphuretted hydrogen is thereupon oxidized according to the formula:

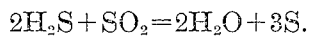
$$2H_2S + SO_2 = 2H_2O + 3S.$$

If the oxidizing gas contains oxygen, for instance intermediately, sulphurous acid may also be formed, for instance after the formula:

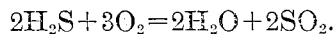
$$2H_2S + 3O_2 = 2H_2O + 2SO_2.$$

The regenerated $H_2O$ reacts afterwards with another quantity of sulphide under formation of sulphuretted hydrogen that is further oxidized by sulphurous acid or oxygen.

It has also proved possible to hasten the oxidation by admitting hydrochloric acid together with the steam. The temperature should then be kept so high that aluminum chloride formed by action of hydrochloric acid is decomposed after the formula

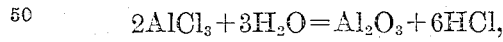
$$2AlCl_3 + 3H_2O = Al_2O_3 + 6HCl,$$

i. e. under regeneration of HCl. In order to make last named reaction as complete as possible, the temperature of the leaving products should surpass 300° C. A special advantage with using oxidizing gases containing HCl lies therein that impurities of sulphurous iron are transformed to ferrous chloride that later can be dissolved out. Also by mixing hydrochloric acid gas in the oxidizing gases the oxidation of the aluminum sulphide may be hastened.

If the temperature when oxidizing material containing aluminum sulphide reaches about 800° C. or thereabove, the aluminum oxide formed loses wholly or substantially its ability to absorb water. This is, however, in many cases a disadvantage, on account whereof it is as a rule to prefer not to let the temperature surpass 700° C. The lower limit for the temperature is of course out of practical reasons dependent upon the speed of reaction, which latter, however, is different for different modifications of the process. To reach the necessary speed of reaction a temperature of at least 200 to 300° C. is usually required. By working with a low temperature of oxidation and oxidation gas containing steam it is possible so to guide the oxidation that aluminum hydrate is formed at the oxidation of aluminum sulphide. In cases when sulphur is to be driven off as free gaseous sulphur, the temperature of the leaving gases must be determined with regard to the boiling point of sulphur, and it has then proved to be suitable to keep the temperature at about 500 to 600° C. To use a temperature below 700° C. has proved to be specially important, if the aluminum sulphide material contains aluminum oxide in crystallized form as corundum, for instance of the kind described in the United States patent specification No. 1,569,483, because when treating the oxidized material with water, the aluminum oxide derived out of aluminum sulphide in such cases absorbs water and expands so that the material is broken up liberating corundum crystals, which afterwards on account of their higher specific gravity can be separated out, for instance, by treating the material with streaming water in classification apparatus. To hasten the decomposition of oxidized material caused by the expansion of the aluminum oxide, it is of advantage to carry out such water treatment under such conditions that the particles are loosened through the action of friction or a slight grinding, for instance in a ball or tube mill.

For the treatment with gaseous oxidizing agent of above named kind apparatus and furnaces may be used of kinds generally used in gas treatment processes. The material may be charged and taken out respectively, either all at a time, or continually, or periodically. If the aluminum sulphide material contains impurities of sulphurous iron or similar sulphides and the oxidation of such sulphides is desired to be avoided, it is suitable to conduct the gas, for instance sulphurous acid, through the apparatus or furnace in the same direction as the aluminum sulphide material. If it is not necessary to consider the risk of oxidizing sulphurous iron, it will as a rule be better to apply the principle of counter current. To get the decomposition as complete as possible, it is often suitable after or immediately after the treatment with oxidizing agent to treat the product in hot condition with an excess of air or steam. For the same purpose the product may alternatively be treated with water in such quantities that the product is cooled down below 100° C. The subsequent treatment may also be done with hydrochloric acid gas, in which case the treatment should occur in the presence of steam, and at a temperature not less than 200° C. and preferably at about 300° C. or more, because aluminum oxide formed by decomposition of aluminum sulphide under these conditions is not transformed into aluminum chloride. Impurities of sulphurous iron are, however, by such treatment substantially transformed into $FeCl_2$ that afterwards may be dissolved out with water. The hydrochloric acid gas and steam may also be admitted by spraying hydrochloric acid dissolved in water into the hot material coming from the oxidation process whereby both the hydrochloric acid and the water are gasified. At the subsequent treatment formed sulphurous acid or sulphuretted hydrogen may suitably afterwards be conducted into that part of the furnace or apparatus in which the oxidation process occurs. Also the steam formed during the subsequent treatment may in a similar way be used for carrying out the oxidation process. The subsequent treatment of the hot material coming from the oxidation process may also occur by means of chlorine gas in order to transform impurifying sulphides of iron, titanium, etc., into chlorine compounds. Such treatment is preferably carried out at such temperature that formed volatile chlorides may be removed in a gaseous condition. At the hot treatment with chlorine gas it has proved of advantage also to admit a gaseous oxygen combination with carbon, such as CO or $CO_2$.

The subsequent treatment of the oxidized sulphidiferous materials may alternatively occur after cooling the material in question, and is then preferably done either with water alone or with water in presence of chlorine or sulphurous acid. When treating with chlorine in the presence of water, the iron present as sulphide is transformed into an iron-chlorine compound, which may be separated out by dissolving. Purification of the products of decomposition by treatment with sulphurous acid in the presence of water is described below.

The sulphidiferous material may, however, according to this invention instead of oxidizing gas be treated with sulphurous acid in the presence of water in order to oxidize and decompose sulphides of aluminum, calcium, barium or magnesium. The oxidation may then wholly or partly occur directly with sulphurous acid, following the formula:

$$2Al_2S_3 + 3SO_2 + 6H_2O = 4Al(OH)_3 + 9S.$$

It may also happen that the sulphide first is decomposed by water under development of sulphuretted hydrogen that afterwards reacts with sulphurous acid under regeneration of water and separation of sulphur. Of course also a number of secondary reactions may occur, such as the formation of hyposulphites, etc., by action of sulphurous acid upon precipitated sulphur. The advantage of decomposing for instance aluminum sulphide with sulphurous acid containing water instead with water alone lies therein that in the former case no or very little sulphuretted hydrogen is developed, as the sulphide sulphur at the treatment with sulphurous acid at least partly is precipitated as free sulphur. If the admitted quantity of sulphurous acid is sufficient thereto, said sulphides are transformed during the treatment into basic, neutral or acid sulphites, hyposulphites or the like. Does the raw material consists of or contain a sulphide easily decomposed by water, such as aluminum sulphide, it will be suitable to admit said raw material successively during the treatment, the sulphurous acid suitably being admitted from the beginning or successively during the treatment in such quantities that sulphurous acid will be present in excess of the quantity necessary for the decomposition of the sulphide. Of advantage is to work with a circulating solution of sulphurous acid, the decomposition taking place in one apparatus or system of apparatus, while the water is regenerated with sulphurous acid in another apparatus or system of apparatus. The products of decomposition formed by treatment with sulphurous acid in the presence of water contain generally impurities in the form of sulphides of iron, titanium, calcium, etc., if for instance the sulphidiferous material was produced by smelting bauxite, carbon and sulphur combinations of heavy metals, such as FeS, in the electric furnace. This invention embraces therefore also processes for refining the ingredients in the decomposition products containing aluminum from impurities, specially such as said sulphides. In connection therewith the invention also embraces the refinement of analogous decomposition products obtained by oxidation of aluminum sulphide material with water instead of with sulphurous acid and water. Above it was mentioned that also decomposition products obtained by oxidation of the sulphidiferous material by means of oxidizing gases could subsequently for refining purposes be treated with sulphurous acid in the presence of water. As the refining procedures for decomposition products obtained in the said different ways are analogous, they will be described together here below.

If the decomposition products contain crystallized aluminum oxide in the form of corundum, it will be suitable but not necessary, by applying some known wet dressing method, to separate such aluminum oxide crystals from lighter decomposition products, such as aluminum hydrate, before the refining process, afterwards treating each of the different products separately. It is also suitable to treat the decomposition products in some strongly magnetic separator, for instance the Ullrich separator, whereby a part of impurifying sulphides of heavy metals can be removed. For the last named purpose the crystallized aluminum oxide may be further or alternatively treated in some flotation process. If the decomposition products contain free sulphur, it may also be suitable to remove the sulphur before the further treatment of the material takes place.

Decomposition products of above named kind that contain aluminum hydrate are treated for the purpose of their purification with sulphurous acid in such quantities that the aluminum hydrate wholly or substantially is dissolved as acid aluminum sulphite. The solution so received will as a rule not be quite free from impurities, because when treating with sulphurous acid impurities in the decomposition products, for instance calcium hydrate, calcium sulphide, sulphurous iron, etc., may also be dissolved. Some of such impurities, for instance sulphurous iron, do however react much slower, wherefore the dissolution with sulphurous acid very well may be so carried out that only a small quantity of sulphurous iron is decomposed and dissolved as sulphite. It is also possible by treating with chlorine or chlorine compounds to remove such impurities wholly or partly before the dissolution of aluminum hydrate with sulphurous acid. Silicic acid occasionally occurring in the decomposition product will remain undissolved at the treatment with sulphurous acid. The dissolved part is separated from the undissolved by decanting or filtering and may thereupon be used for the production of aluminum oxide or other aluminum compounds in a number of different ways. This may for instance be done by driving out the sulphurous acid by heating the solution. Already when heating below the boiling point the solution gives off considerable quantities of sulphurous acid and basic aluminum sulphite is precipitated. If this precipitation of basic aluminum sulphite through heating is carried out in two or more periods or if the heating is interrupted before a larger quantity of impurities also begins to precipitate, it is possible to receive the main part of the basic aluminum sulphite particularly pure. Impurities of iron, for instance, will stay almost entirely in the solution. The precipitated salt is filtered away and washed. Heating the water to the boiling point will certainly hasten the removal of the surplus of sulphurous acid, but is not necessary as mentioned above. By working in vacuum it is also possible to hasten the removal of sulphurous acid and the advantage of working at lower temperature is also gained.

When producing aluminum salts out of basic aluminum sulphite obtained in the mentioned way the same may be added to an acid, for instance sulphuric acid, or one may also cautiously add an acid to it, whereupon the sulphurous acid leaves. The concentration of the acid should be such that a very concentrated solution is obtained, or, for instance after cooling but without special evaporation, that only or almost only solid salt is obtained. To produce aluminum sulphite, the same is heated so that sulphurous acid and water leave. The sulphurous acid may then be driven off even by a comparatively slight heating. The heating should suitably be so carried out that no oxidation of aluminum sulphite to sulphate worth mentioning occurs. If a gas heated rotary furnace is used, it is of said reasons best that the heating occurs concurrently.

The basic aluminum sulphite may be converted into aluminum hydrate by means of a neutralizing agent for the sulphurous acid. As such may for instance be used ammonia, alkali, alkali aluminate, alkali carbonate; such as sodium hydrate and carbonate.

When treating the material containing aluminum sulphide or aluminum hydrate with sulphurous acid, the material is preferably kept suspended in water, for instance in a container provided with stirring appliances. The treatment can occur both at atmospheric pressure and at higher pressure, for instance in an autoclave. The advantage of higher pressure lies therein that the water then can dissolve more sulphurous acid. The sulphurous acid may be added in the form of gas or dissolved in water or other dissolvent, or also be added in a state compressed to liquid. As water dissolves a larger quantity of sulphurous acid at a lower temperature, it is of advantage to cool the same during the treatment. Such cooling is especially suitable, if the treatment with sulphurous acid has proceeded so far that formation of aluminum sulphite occurs, because when aluminum hydrate is decomposed by sulphurous acid, heat is developed. The sulphurous acid necessary for the decomposition of sulphide, may also wholly or partly be admitted in the form of substances that are able to give off sulphurous acid. This is of special advantage when treating materials containing sulphides that are easily decomposed by water, such as $Al_2S_3$. For the said purpose both basic, neutral and acid sulphite, may be used, for instance of sodium, potassium, ammonium and aluminum. The above mentioned solution that contains acid aluminum sulphite is well fitted for the purpose.

Oxidation of the sulphidiferous material according to the present process may also occur by heating the material together with salts of acids, such as sulphates or carbonates of potassium and sodium.

This process may with advantage be used for oxidizing slags containing aluminum sulphide in such processes for desulphurizing heavy metal sulphides, in which the slag after oxidation reenters the process for the purpose of desulphurizing another quantity of sulphide ore.

Subject matter relating to the use of sulphur dioxide and water to decompose the sulphides is being claimed in a copending divisional application #232,940 filed November 12, 1927.

I claim:—

1. Process for producing aluminum oxide products out of aluminum sulphide containing material comprising substituting sulphur by oxygen by treating the sulphide material in a solidified condition with oxidizing agent of a kind acting by giving off oxygen and able to decompose sulphuretted hydrogen.

2. Process for producing aluminum oxide products out of aluminum sulphide containing material comprising substituting sulphur by oxygen by treating the sulphide material in a solidified condition with an oxygen containing oxidizing gas.

3. Process for producing aluminum oxide products out of aluminum sulphide containing material comprising substituting sulphur by oxygen by treating the sulphide material in a solidified condition with a both oxygen and water vapour containing oxidizing gas.

4. Process for producing aluminum oxide products out of aluminum sulphide containing material comprising substituting sulphur by oxygen by treating the sulphide material with a sulphur oxygen combination containing oxidizing gas.

5. Process for producing aluminum oxide products out of aluminum sulphide containing material comprising substituting sulphur by oxygen by treating the sulphide material with a sulphur dioxide containing gas.

6. Process for producing aluminum oxide products out of aluminum sulphide containing material comprising substituting sulphur by oxygen by treating the sulphide material with an oxidizing agent of a kind acting by giving off oxygen and able to decompose sulphuretted hydrogen, regulating the amount of oxygen and so that at least a considerable part of the sulphur is separated out as free sulphur.

7. Process for producing aluminum oxide products out of aluminum sulphide containing material comprising substituting sulphur by oxygen by treating the sulphide material with gaseous sulphur dioxide, regulating the temperature so that at least a considerable part of the sulphur is separated out and distills off as free sulphur.

8. Process for the manufacture of alumina comprising forming, on refining aluminum oxide containing raw material, a melt containing after solidifying particles of substantially pure fused alumina intimately mixed with sulphide of a kind able in fused fluid condition to dissolve alumina, decomposing sulphide in said melt by treating the melt in solidified condition with oxidizing agent of a kind acting by giving off oxygen and able to decompose sulphuretted hydrogen and separating the crystallized alumina out of the oxidized melt.

9. Process for the manufacture of alumina comprising forming, on refining aluminum oxide containing raw material, a melt containing after solidifying particles of substantially pure fused alumina intimately mixed with sulphide of a kind able in fused fluid condition to dissolve alumina, decomposing sulphide in said melt by treating the melt in solidified condition with an oxygen containing oxidizing gas and separating the fused alumina out of the treated melt.

10. Process for the manufacture of alumina comprising forming, on refining aluminum oxide containing raw material, a melt containing after solidifying particles of substantially pure fused alumina intimately mixed with sulphide of a kind able in fused fluid condition to dissolve alumina, decomposing sulphide in said melt by treating the melt in solidified condition with a both oxygen and water vapour containing oxidizing gas and separating the fused alumina out of the treated melt.

11. Process for the manufacture of alumina comprising forming, on refining aluminum oxide containing raw material, a melt containing after solidifying particles of substantially pure fused alumina intimately mixed with sulphide of a kind able in fused fluid condition to dissolve alumina, decomposing sulphide in said melt by treating the melt in solidified condition with a sulphur-oxygen combination containing oxidizing gas and separating the fused alumina out of the treated melt.

12. Process for the manufacture of alumina comprising forming, on refining aluminum oxide containing raw material, a melt containing after solidifying particles of substantially fused alumina intimately mixed with sulphide of a kind able in fused fluid condition to dissolve alumina, decomposing sulphide in said melt by treating the melt in solidified condition with a sulphur dioxide and water vapour containing gas and separating the fused alumina out of the treated melt.

13. Process for the manufacture of alumina comprising forming on refining aluminum oxide containing raw material, a melt containing after solidifying particles of substantially pure fused alumina intimately mixed with sulphide of a kind able in fused fluid condition to dissolve alumina, decomposing sulphide in said melt by treating the melt in solidified condition with an oxidizing agent of a kind acting by giving off oxygen and able to decompose sulphuretted hydrogen, regulating the amount of oxidizing agent so that at least a considerable part of the sulphur is separated out as free sulphur and and separating the fused alumina out of the treated melt.

14. Process for the manufacture of alumina comprising forming, on refining aluminum oxide containing raw material, a melt containing after solidifying particles of substantially pure fused alumina intimately mixed with sulphide of a kind able in fused fluid condition to dissolve alumina, decomposing sulphide in said melt by treating the melt in solidified condition with an oxidizing aegnt of a kind acting by giving off oxygen and able to decompose sulphuretted hydrogen, regulating the amount of oxidizing agent and the temperature so that at least a considerable part of the sulphur is separated out and distills off as free sulphur, and separating the fused alumina out of the treated melt.

15. Process for the manufacture of alumina comprising forming, on refining aluminum oxide containing raw material, a melt containing after solidifying particles of substantially pure fused alumina intimately mixed with sulphide of a kind able in fused fluid condition to dissolve alumina, decomposing sulphide in said melt by treating the melt in solidified condition with oxidizing agent of a kind acting by giving off oxygen and able to decompose sulphuretted hydrogen, thereupon treating the oxidized melt with water and separating the fused alumina out of the treated melt.

16. Process for the manufacture of alumina comprising forming, on refining aluminum oxide containing raw material, a melt containing after solidifying particles of substantially pure fused alumina intimately mixed with aluminum sulphide, decomposing sulphide in said melt by treating the melt with oxidizing agent of a kind acting by giving off oxygen and able to decompose sulphuretted hydrogen and regulating the temperature during the oxidation so that aluminum oxide formed does not lose its ability to absorb water, thereupon treating the oxidized melt with water and separating the fused alumina out of the treated melt.

17. Process for the manufacture of alumina comprising forming, on refining aluminum oxide containing raw material, a melt containing after solidifying particles of substantially pure fused alumina intimately mixed with aluminum sulphide, decomposing sulphide in said melt by treating the melt with an oxidizing agent of a kind acting by giving off oxygen and able to decompose sulphuretted hydrogen, regulating the amount of oxidizing agent so that at least a considerable part of the sulphur is separated out as free sulphur and regulating the temperature during the oxidation so that aluminum oxide formed does not lose its ability to absorb water, thereupon treating the oxidized melt with water and separating the fused alumina out of the treated melt.

18. Process for the manufacture of alumina, comprising forming, on refining aluminum oxide raw material, a melt containing after solidifying particles of substantially pure fused alumina intimately mixed with aluminum sulphide, decomposing sulphide in said melt by treating the melt with an oxidizing agent of a kind acting by giving off oxygen and able to decompose sulphuretted hydrogen, regulating the amount of oxidizing agent so that at least a considerable part of the sulphur is separated out as free sulphur and carrying on said oxidation at such a temperature that aluminum oxide formed does not lose its ability to absorb water but still enough high to enable free sulphur to distill off, thereupon treating the oxidized melt with water and separating the fused alumina out of the treated melt.

19. Process for producing aluminum oxide products out of aluminum sulphide containing material comprising substituting sulphur by oxygen by treating the sulphide material in a solidified condition with a gaseous oxidizing agent, thereupon decomposing still undecomposed sulphide by treating the oxidized melt with a chlorinating agent.

20. Process for producing aluminum oxide products out of aluminum sulphide containing material comprising substituting sulphur by oxygen by treating the sulphide material in a solidified condition with an oxidizing agent, thereupon treating the oxidized melt with chlorine gas in the presence of a gaseous carbon-oxygen combination.

21. In a process of producing aluminum oxide in which aluminum sulphide is decomposed into aluminum oxide, the step of removing impurities of iron and titanium sulphides by treating the decomposed product with a chlorine containing gas at such a temperature that formed chlorides of iron and titanium distills off.

In testimony whereof I have hereunto set my hand.

TURE ROBERT HAGLUND.